(12) United States Patent
Purushothaman

(10) Patent No.: US 10,678,629 B2
(45) Date of Patent: Jun. 9, 2020

(54) DYNAMIC FAILURE-RESOLUTION COMPUTING ENGINE

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 260 days.

(21) Appl. No.: 15/824,031

(22) Filed: Nov. 28, 2017

(65) Prior Publication Data

US 2019/0163560 A1    May 30, 2019

(51) Int. Cl.
*G06F 9/44* (2018.01)
*G06F 11/00* (2006.01)
(Continued)

(52) U.S. Cl.
CPC ...... *G06F 11/0793* (2013.01); *G06F 11/0706* (2013.01); *G06F 11/079* (2013.01);
(Continued)

(58) Field of Classification Search
CPC ............ G06F 11/3495; G06F 11/0709; G06F 11/079; G06F 11/3616; G06F 9/5061;
(Continued)

(56) References Cited

U.S. PATENT DOCUMENTS

| 6,070,190 A * | 5/2000 | Reps ............... G06F 11/3495 |
| | | 709/203 |
| 6,505,145 B1 * | 1/2003 | Bjornson ........... G05B 23/0278 |
| | | 702/185 |

(Continued)

OTHER PUBLICATIONS

Jonathan D. Gibbs et al., Synchronizing DEVS/SOA Simulator with Ping Monitoring Application, 2010, [Retrieved on Mar. 6, 2020]. Retrieved from the internet: <URL: https://dl.acm.org/doi/pdf/10.1145/1878537.1878682?download=true> 7 Pages (1-7) (Year: 2010).*

(Continued)

*Primary Examiner* — Anibal Rivera
(74) *Attorney, Agent, or Firm* — Weiss & Arons LLP; Michael A. Springs, Esq.

(57) ABSTRACT

A method for dynamically resolving a failure occurring to an application is provided. The method may include receiving historic observations from a plurality of sources. The plurality of sources may be associated with an application executing in the environment. The method may include storing the plurality of historic observations in a memory location associated with the application. The method may include monitoring the application using an adaptive monitoring model. The monitoring model may include a first and second set of dynamic attributes for the application. The second set of dynamic attributes may be dependent on a current set of values assigned to the first set of dynamic attributes. The application may be monitored once during each monitoring cycle. At least once during each monitoring cycle, the second set of dynamic attributes may be adjusted based on the current set of values of the first set of dynamic attributes.

18 Claims, 4 Drawing Sheets

(51) Int. Cl.

| | | |
|---|---|---|
| *G06F 21/57* | (2013.01) | |
| *G06F 9/46* | (2006.01) | |
| *G06F 11/07* | (2006.01) | |
| *G06F 11/36* | (2006.01) | |
| *G06F 11/30* | (2006.01) | |
| *G06F 11/34* | (2006.01) | |

(52) U.S. Cl.
CPC ...... *G06F 11/0709* (2013.01); *G06F 11/0751* (2013.01); *G06F 11/0787* (2013.01); *G06F 11/302* (2013.01); *G06F 11/3452* (2013.01); *G06F 11/3457* (2013.01); *G06F 11/3495* (2013.01); *G06F 11/3616* (2013.01); *G06F 11/3688* (2013.01); *G06F 11/3692* (2013.01); *G06F 2201/865* (2013.01)

(58) Field of Classification Search
CPC .. G06F 9/5083; G06F 9/4492; G06F 9/44505; G06F 8/61; G06F 8/62; G06F 21/55; G06F 16/217; G06F 11/0793; G06F 11/0706; G06F 11/0751; G06F 11/0787; G06F 11/302; G06F 11/3452; G06F 11/3457; G06F 11/3688; G06F 11/3692; G06Q 30/02; G06Q 30/0256; H04L 41/0681; H04L 41/0654; H04L 41/145; H04L 41/50
See application file for complete search history.

(56) References Cited

U.S. PATENT DOCUMENTS

| | | | | |
|---|---|---|---|---|
| 6,647,301 | B1* | 11/2003 | Sederlund | G05B 19/0428 700/108 |
| 6,789,215 | B1* | 9/2004 | Rupp | G06F 8/61 714/38.14 |
| 7,143,153 | B1* | 11/2006 | Black | H04L 41/0681 709/223 |
| 7,296,268 | B2* | 11/2007 | Darling | G06F 9/5061 709/230 |
| 7,490,073 | B1* | 2/2009 | Qureshi | G06F 11/079 706/50 |
| 7,584,165 | B2* | 9/2009 | Buchan | G06Q 10/06 706/60 |
| 7,707,226 | B1* | 4/2010 | Tonse | G06Q 30/02 707/796 |
| 8,214,372 | B2* | 7/2012 | Gupta | G06F 9/44505 707/748 |
| 8,214,798 | B2* | 7/2012 | Bellucci | G06F 11/366 702/186 |
| 8,769,346 | B2* | 7/2014 | Sijelmassi | G06F 11/0709 714/47.1 |
| 8,984,124 | B2* | 3/2015 | Maralack | G06F 11/3495 709/223 |
| 9,092,802 | B1* | 7/2015 | Akella | G06F 40/30 |
| 9,251,033 | B2* | 2/2016 | Kirchhofer | G06F 9/5083 |
| 9,479,416 | B2* | 10/2016 | Black | H04L 41/145 |
| 2004/0153437 | A1* | 8/2004 | Buchan | G06Q 10/06 |
| 2004/0203755 | A1* | 10/2004 | Brunet | H04W 8/18 455/432.1 |
| 2006/0229896 | A1* | 10/2006 | Rosen | G06Q 10/10 705/321 |
| 2007/0240154 | A1* | 10/2007 | Gerzymisch | G06F 8/61 717/174 |
| 2008/0091738 | A1* | 4/2008 | Devraj | G06F 16/217 |
| 2010/0017787 | A1* | 1/2010 | Bellucci | G06F 11/3616 717/111 |
| 2012/0144236 | A1* | 6/2012 | Black | H04L 41/145 714/25 |
| 2014/0130036 | A1* | 5/2014 | Gurikar | G06F 8/61 717/176 |
| 2015/0236896 | A1* | 8/2015 | Brown | H04L 41/0654 709/201 |
| 2015/0288557 | A1* | 10/2015 | Gates | G06F 11/3006 714/37 |
| 2017/0024240 | A1* | 1/2017 | Black | G06F 11/3664 |
| 2018/0083851 | A1* | 3/2018 | Gravenites | H04L 67/26 |
| 2018/0219904 | A1* | 8/2018 | Gorodissky | H04L 43/50 |
| 2018/0270268 | A1* | 9/2018 | Gorodissky | H04L 43/50 |
| 2018/0314531 | A1* | 11/2018 | Rhodes | G06F 9/4492 |
| 2019/0114435 | A1* | 4/2019 | Bhalla | G06F 21/55 |

OTHER PUBLICATIONS

Manoj K. Agarwal et al., Problem Determination Using Dependency Graphs and Run-Time Behavior Models, 2004, [Retrieved on Mar. 6, 2020]. Retrieved from the internet: <URL: https://link.springer.com/content/pdf/10.1007/978-3-540-30184-4_15.pdf> 12 Pages (171-182) (Year: 2004).*

"What is Block," http://searchsqlserver.techtarget.com/definition/block, Retrieved on Nov. 24, 2017.

Christopher M. Bishop, "Pattern Recognition and Machine Learning," Springer 2006, Retrieved on Nov. 22, 2017.

"Computer Architecture Simulator," https://en.wikipedia.org/wiki/Computer_architecture_simulator, Retrieved on Nov. 22, 2017.

National Weather Service Office of Hydrologic Development: General Software Development Standards and Guidelines Version 3.5, http://docplayer.net/16958826-General-software-development-standards-and-guidelines-version-3-5.html, Jul. 30, 2007.

"Graphical Model," https://en.wikipedia.org/wiki/Graphical_model, Retrieved on Nov. 22, 2017.

"Software Design Pattern," https://en.wikipedia.org/wiki/Software_design_pattern, Retrieved on Nov. 22, 2017.

"UML Diagram: Everything You Need to Know About UML Diagrams," https://www.smartdraw.com/uml-diagram/, Retrieved on Nov. 26, 2017.

"Web Analytics," https://en.wikipedia.org/wiki/Web_analytics, Retrieved on Nov. 24, 2017.

"What is SOP (Standard Operating Procedure or Super Operator)?", https://www.computerhope.com/jargon/s/sop.htm, Retrieved on Nov. 26, 2017.

"What Does Artifact Mean?" https://softwareengineering.stackexchange.com/questions/106473/what-does-artifact-mean, Retrieved on Nov. 24, 2017.

* cited by examiner

DYNAMIC FAILURE-RESOLUTION COMPUTING ENGINE

FIELD OF TECHNOLOGY

This invention relates to failure detection and remediation.

BACKGROUND OF THE DISCLOSURE

Typically, monitoring models are setup to detect and remediate failures within an environment. Conventional monitoring assesses the health and functionality of various application components within the environment using a standard monitoring system. Standardized scripts are used to remediate any detected failures. Because environmental components and environmental architecture are continually changing and being updated, many of the standardized scripts are unable to fully remediate the failures within the environment. Therefore, a dynamic failure-resolution computing engine would be desirable. It would be further desirable for the computing engine to generate dynamic scripts for failure remediation.

SUMMARY OF THE INVENTION

A method for dynamically resolving a failure occurring to an application is provided. The method may include retrieving historic observations from a plurality of sources. The plurality of sources may be associated with an application executing in the environment.

The method may include storing the plurality of historic observations in a memory location associated with the application. The method may include monitoring the application using an adaptive monitoring model.

The adaptive monitoring model may include a first set of dynamic attributes for the application. The adaptive monitoring model may include a second set of dynamic attributes for the application. The second set of dynamic attributes may depend on a current set of values assigned to the first set of dynamic attributes. The application may be monitored once during each monitoring cycle. At least once during each monitoring cycle, the second set of dynamic attributes may be adjusted based on the current set of values of the first set of dynamic attributes.

The method may include determining a failure occurring in the application. The failure determination may be based on the monitoring.

The method may include determining an executable for failure remediation. The determining may be based on the determined failure, the monitoring and/or the received historic observations.

The method may include simulating the executable. The executable may remediate the application failure in a simulation environment. The simulation environment may include graphical models, meta representations, functional simulators and pattern models.

The method may include generating a script for remediation of the application failure in the environment. The generating may be performed in response to a determination that the executable remediates the application failure in the simulation environment.

The method may include executing the script on the application in the environment. The method may include deleting the script from the environment.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
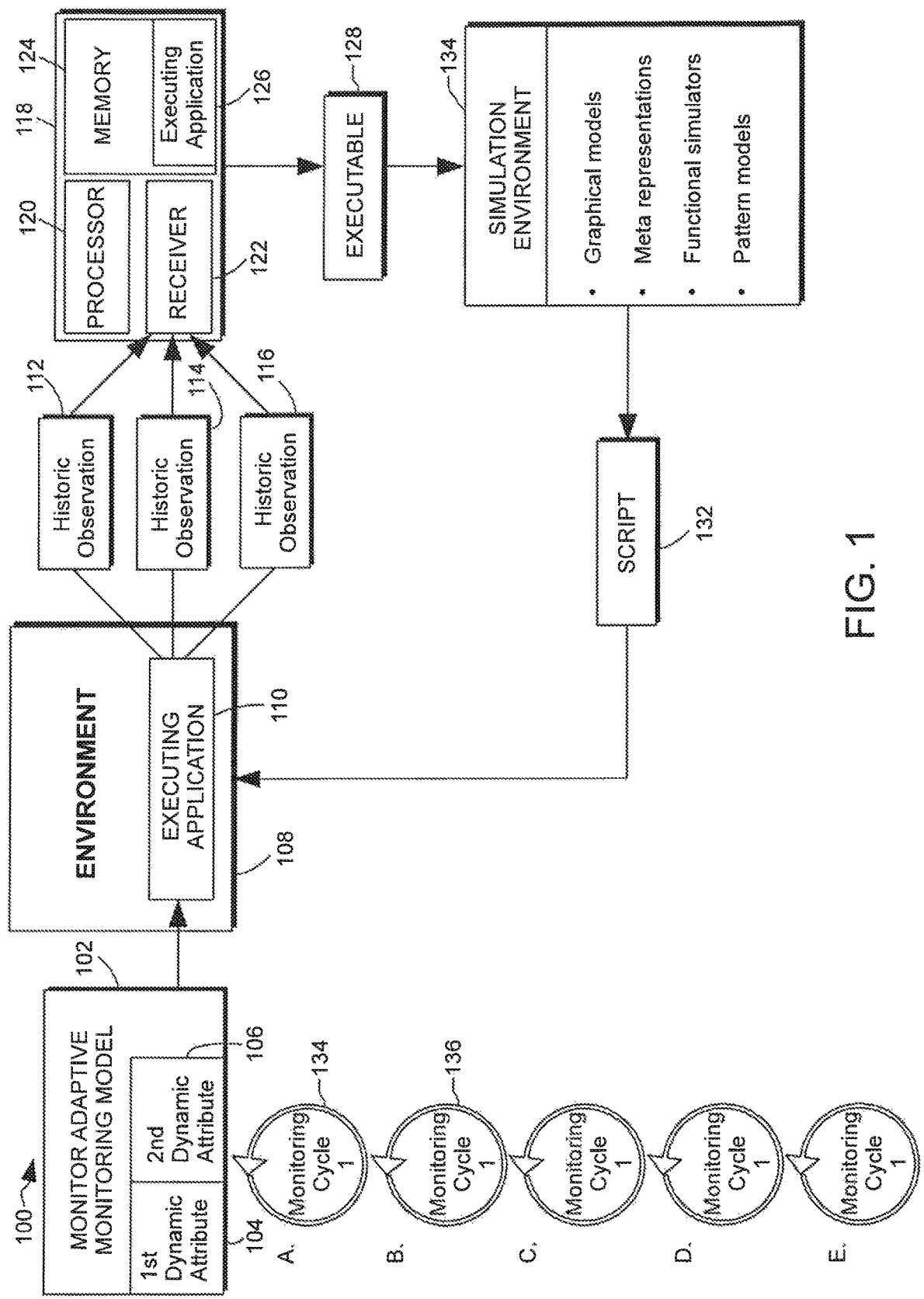
FIG. 1 shows an illustrative hybrid diagram/flow chart in accordance with principles of the invention.

A dynamic failure-resolution computing engine may be provided. The engine may include a receiver. The receiver may be configured to receive historic observations. The historic observations may be associated with an application executing in an environment. The historic observations may relate to software development lifecycle (SDLC) data of the application. The historic observations may include information relating to historic issues that may occur during development and/or operation of the application. The historic observations may also include information relating to development and/or operation of historic executables used to remediate the historic issues that occurred during development and/or operation of the application.

In some embodiments, a software and/or hardware component may retrieve the historic observations and transmit the observations to the receiver.

The historic observations may be retrieved and/or received from a plurality of sources. The plurality of sources may include a database which stores historic software engineering considerations. The sources may also include a database that stores infrastructure engineering processes used to meet historic project requirements. The historic project requirements may include requirements generated for a project associated with the application. The sources may include a database that stores security considerations of the application.

During development of the application and/or prior to deployment of the application, testing may have been performed on the application. Testing of the application may be performed on a developing application in order to determine failures in the application that require remediation. Testing of the application may also determine that one or more software components, included in the application, are operating acceptably. Outcomes of the testing may be stored in a database. The database that stores the testing outcomes may be included in the plurality of sources.

The plurality of sources for historic observations may also include a database which stores coding policies associated with a historic software development lifecycle of the application. A coding policy may be a set of a rules, standards and/or guidelines for developing and maintaining software applications. A coding policy may be computer language agnostic or computer language specific. Examples of standards included in a coding policy may be internal documentation standards, indentation standards, compiler warning response standards and GO TO statements use restrictions, all of which are explained in further detail below.

Examples of internal documentation standards may require documenting module name and/or author name in a comment block at the start of a module. An example of an indentation standard may require a three space minimum indent. An example of a compiler warning response standard may require compiler warnings resolution prior to code compilation. An example of GO TO statements use restrictions may prohibit the use of GO TO statements except when coding in FORTRAN™ computer language.

The plurality of sources for historic observations may also include a database which stores integration and hardening challenges associated with the historic software development lifecycle of the application. The plurality of sources may also include a database which stores infrastructure and product configurations. The plurality of sources may also include a database which stores special considerations associated with the historic software development lifecycle of the application. A database which stores penetration testing may also be included in the plurality of sources. A database which stores architecture analysis of the historic software development lifecycle of the application may also be included in the plurality of sources.

The engine may include a processor. The processor may be configured to store the plurality of historic observations in a memory location. The memory location may be specific to the application. The memory location may be associated with the application.

The processor may be configured to monitor the application. The monitoring may be executed using an adaptive monitoring model. The adaptive monitoring model may monitor the application using monitoring cycles. The adaptive monitoring model may include a first set of dynamic attributes for the application. The adaptive monitoring model may also include a second set of dynamic attributes for the application. The second set of dynamic attributes may be dependent on a set of values assigned to the first set of dynamic attributes. The set of values may be dynamic—i.e., continually changing, continually being updated, revolving, changing at specific intervals or any other non-constant approach. The second set of dynamic attributes may be adjusted based on a current set of values assigned to the first set of dynamic attributes. The adjustment to the second set of dynamic attributes may be executed at least once during a monitoring cycle.

In some embodiments, the first set of dynamic attributes may include performance of the application.

It should be appreciated that each attribute included in the first set of dynamic attributes may change during a time period. For example, performance of the application may be quantified as 85% efficient—i.e., that a predetermined percentage of the total environment resources are in use—at one point in time and may be quantified as 32% efficient at a different point in time. Additionally, at one point in time, performance of the application may define an efficiency metric combined with a speed metric, and at another point in time, performance of the application may define an accuracy metric.

The first set of dynamic attributes may also include a metric associated with performance of the environment. For example, at one point in time, performance of the environment may be defined as a total environment central processing unit ("CPU") usage metric. When the performance of the environment is defined as a total environment CPU usage metric, at one point in time the CPU usage may be 72% and at a different point in time the CPU usage may be 12%. The change in CPU usage may be triggered because of a change in the number of applications running within the environment. The change may also be triggered because of any other suitable reason. At a different point in time, performance of the environment may be defined as a memory usage metric. At yet a different point in time, performance of the environment may be defined as a combination of a CPU usage metric and a memory usage metric.

The first set of dynamic attributes may include data relating to whether the application is resident on a multi-tenant environment or a discrete environment. For example, the environment may migrate from a discrete environment—i.e., an environment where a system accesses its own dedicated resources- to a multitenant environment—i.e., an environment where multiple tenants (or systems) access shared resources. The environment may also be splintered into various discrete environments from a single multitenant environment.

The first set of dynamic attributes may include a binary attribute dependent on whether the application is a cloud model or not. In some embodiments, the application may be migrated from a non-cloud model to a cloud model at a point in time. Accordingly, this attribute could change at some point in time.

The first set of dynamic attributes may also include dependencies of the application and application model data.

As shown in the above examples, the values of the first set of dynamic attributes and the dynamic attributes themselves may change. Because the second set of dynamic attributes may be dependent on the values of the first set of dynamic attributes and/or on the first set of dynamic attributes themselves, and the second set of dynamic attributes are used to monitor application failures, the second set of dynamic attributes may require updating prior to determination of a failure at the application and/or determination of a remediation for the determined failure.

The second set of dynamic attributes may include a monitoring source for the adaptive monitoring model. The second set of dynamic attributes may also include a server or server instance being queried by the application. Business rules associated with the application may also be included in the second set of dynamic attributes. The type of application may also be included in the second set of dynamic attributes. The second set of dynamic attributes may also include observation alerting and triggering data. Also included in the second set of dynamic attributes may be compliance data. Policy data and data correlation may also be included in the second set of dynamic attributes.

The processor may also be configured to determine a failure occurring in the application. The determination may be based on the monitoring.

The processor may also be configured to determine any one selection of one or more executables for failure remediation. The determination may be based on the determined failure, the monitoring and/or on the historic observations as received at the receiver.

In some embodiments, upon determination of a failure during a monitoring cycle, an alert may be generated. The generated alert may trigger determination of the executable.

The processor may be configured to simulate the executable remediating the application failure in a simulation environment. The simulation environment may include graphical models, meta representations, functional simulators and pattern models.

The processor may be configured to generate a script for remediating the application failure in the environment. The script may be generated upon determination that the executable successfully remediates the application failure in the simulation environment. The script may be based in part or in whole on the executable.

The processor may be configured to execute the script on the application in the environment. The processor may delete the script from the environment. The script may be deleted from the environment upon determination that the failure has been successfully remediated by the execution of the script. The processor may also delete the script from the point of script generation.

The processor may store the executable as a historic observation. The processor may also store the executable and/or simulation environment setup for use with future failures.

It should be appreciated that, in certain embodiments, the scripts may not be stored in the environment. Therefore, the static scripts that refer to out of date data may not be available within the environment.

The dynamic failure-resolution computing engine may include non-transitory machine readable memory. The non-transitory memory may store computer executable instructions. The engine may include a processor configured to execute the computer executable instructions. For example, a processor circuit may be embedded in an integrated circuit board of the engine. The processor may control overall operation of the failure resolution engine and its associated components.

The dynamic failure-resolution computing engine may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the engine to perform various functions. For example, the non-transitory memory may store software used by the dynamic failure-resolution computing engine, such as an operating system, application programs, web browser and a database.

Software application programs, which may be used by the dynamic failure-resolution computing engine, may include computer executable instructions for invoking user functionality related to communication, such as email, short message service ("SMS"), and voice input and speech recognition applications. Application programs may utilize one or more algorithms that generate simulation environments, executables, scripts, retrieve observations or any other suitable tasks.

The dynamic failure-resolution computing engine may operate in a networked environment. For example, the dynamic failure-resolution computing engine may support network connections to other systems within the complex web and retrieve observations. The dynamic failure-resolution computing engine may support establishing network connections to one or more remote computers. Such remote computers may be nodes on a network. The nodes may be personal computers or servers that include many or all of the elements described above relative to the dynamic failure-resolution computing engine.

The network connections may include a local area network ("LAN") and a wide area network ("WAN"), and may also include other networks. When used in a LAN networking environment, the dynamic failure-resolution computing engine may be connected to the LAN through a network interface or adapter. The communication circuit may include the network interface or adapter.

When used in a WAN networking environment, the dynamic failure-resolution computing engine may include a modem or other means for establishing communications over a WAN, such as the Internet. It will be appreciated that the existence of any of various well-known protocols such as TCP/IP, Ethernet, FTP, HTTP and the like is presumed, and the dynamic failure-resolution computing engine can be operated in a client-server configuration to permit a user to retrieve web pages from a web-based server. Web browsers can be used to display and manipulate data on web pages.

The dynamic failure-resolution computing engine and network nodes may include various other components, such as a battery, a speaker, and antennas. For example, network nodes may be portable devices such as a laptop, a tablet, chat-bot, a smartphone or any other suitable device for receiving, storing, transmitting and/or displaying relevant information.

The dynamic failure-resolution computing engine may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The dynamic failure-resolution computing engine may utilize computer-executable instructions, such as program modules, executed by a computer. Generally, program modules include routines, programs, objects, components, data structures, etc. that perform particular tasks or implement particular data types. The dynamic failure-resolution computing engine may be operational with distributed computing environments where tasks are performed by remote processing devices that are linked through a communications network. In a distributed computing environment, program modules may be located in both local and remote computer storage media including memory storage devices.

A device that accesses the dynamic failure-resolution computing engine may include one or more features of the dynamic failure-resolution computing engine. For example, an accessing device may be a smart phone, desktop computer or other device. The accessing device may be operated by a system administrator. For example, a system administrator may use the accessing device to retrieve observations, determine failures, determine executables and determine scripts.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

Processes in accordance with the principles of the invention may include one or more features of the processes illustrated in the FIGS. For the sake of illustration, the steps of the illustrated processes will be described as being performed by a "system." The "system" may include one or more of the features of the apparatus that are shown in FIGS. 1-4 and/or any other suitable device or approach. The "system" may be provided by the organization, another party or any other suitable party.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative hybrid diagram/flow chart 100. Adaptive monitoring model 102 may monitor executing application 110. Adaptive monitoring model 102 may include a first set of dynamic attributes, shown at 104. Adaptive monitoring model 102 may also include a second set of dynamic attributes, shown at 106. Executing application 110 may reside in environment 108.

First set of dynamic attributes 104 and second set of dynamic attributes 106 may be specific to executing application 110. Adaptive monitoring model 102 may use first dynamic attribute set 104 and second dynamic attribute set 106 to monitor executing application 110. Adaptive monitoring model 102 may use monitoring cycles, such as monitoring cycle 134 and monitoring cycle 136 to monitor executing application 110. During each monitoring cycle 134 and 136, second set of dynamic attributes 106 are adjusted based on current values of first set of dynamic attributes 104.

Historic observations 112, 114 and 116 may be generated during a software development lifecycle of executing application 110. Historic observations may include various issues occurred, and remediation measures that were performed during the development of executing application 110. More detailed historic observations have been included in FIG. 4.

System 118 may include processor 120, receiver 122 and memory 124. Memory 124 may include a designated section for executing application 110, as shown at 126. Receiver 122 may include historic observations 112, 114 and 116. Processor 120 may store historic observations 112, 114 and 116 in designated section of memory 126.

Upon determination of a failure occurring during the operation of executing application 110, processor 120 may generate executable 128 for remediation of the failure. Executable 128 may be based on first set of dynamic attributes 104 and second set of dynamic attributes 106. Because executable 128 is generated based on first set of dynamic attributes 104 and second set of dynamic attributes 106, executable 128 may be a current up to date and accurate remediation method for the determined failure.

In order to ascertain the effectiveness of executable 128 in remediating the failure, executable 128 may be run in simulation environment 130. Simulation environment 130 may include graphical models, meta representations, functional simulators and pattern models. Script 132 may be generated in the event that executable 128 successfully remediates the failure in simulation environment 130. Script 132 may include the capabilities of executable 128. Script 132 may be executed within environment 108. The execution of script 132 may remediate the failure of executing application 110.

Script 132 may be specific to the current values of dynamic attributes 104 and 106. Because dynamic attributes 104 and 106 are continually changing, script 132 may be unable to remediate a failure at a different point in time. Therefore, upon remediation completion, script 132 may be deleted.

It should be appreciated that simulation environment 130 and executable 128 may be stored for later usage. In the event that a failure occurs at a different point in time, simulation environment 130 and executable 128 need not be re-created in order to generate a script. The generated script may conform to current values for sets of dynamic attributes 104 and 106.

Figure 2:
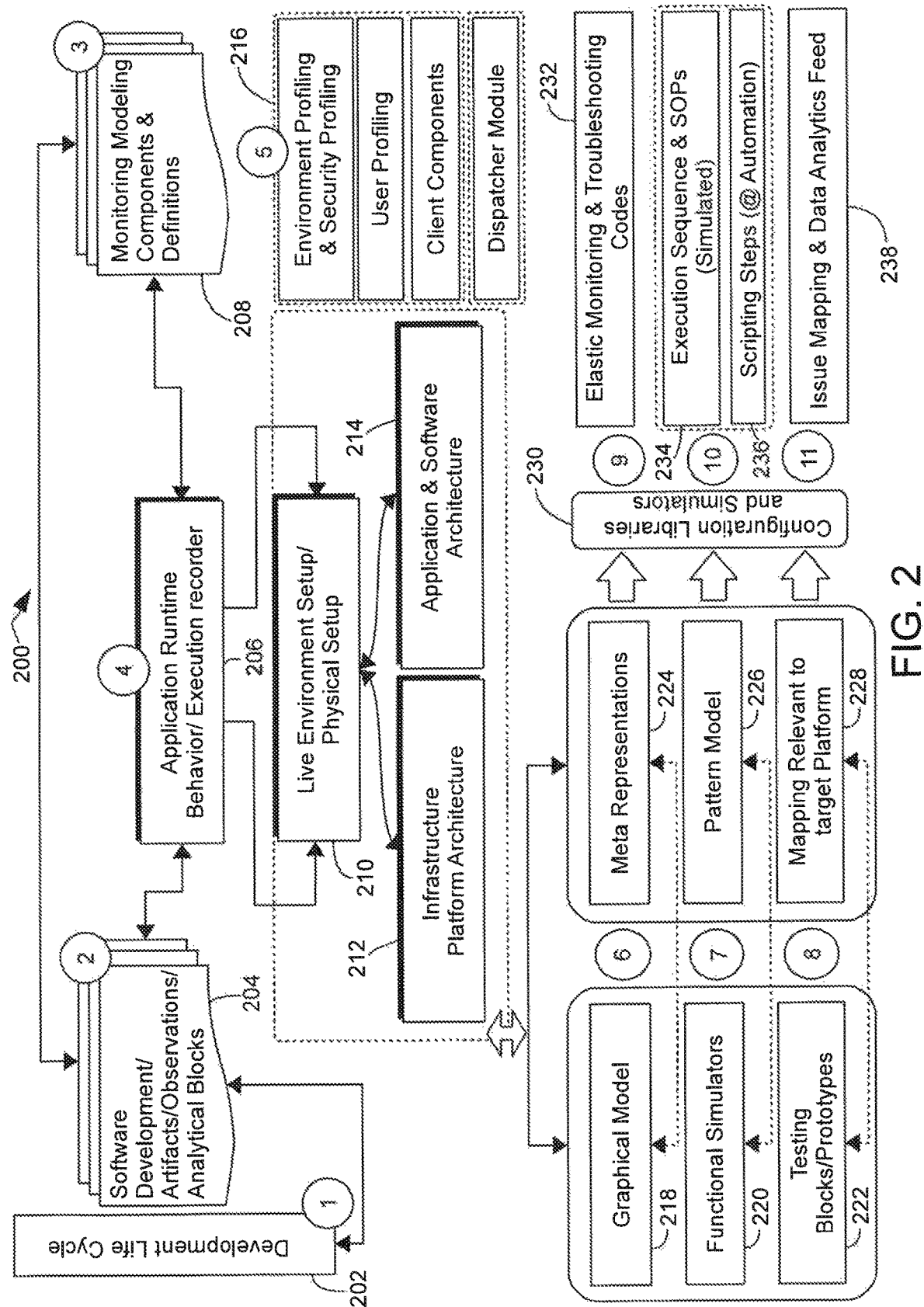
FIG. 2 shows another illustrative hybrid diagram/flow chart in accordance with principles of the invention.

FIG. 2 shows illustrative hybrid diagram/flow chart 200. An application may be developed within a software development lifecycle ("SDLC"), as shown at step 202. An engine may record all of the events that occurred to an application. Such events may include developments, infrastructure lifecycle observations, test outcomes, challenges, artifacts, analytic blocks and workarounds that occurred to an application. A software artifact may be a one of the various tangible by-products produced during the development of software. Examples of artifacts may include use cases, class diagrams, unified modeling language ("UML") models, requirements, design documents, project plans, business cases and risk assessments. Artifacts may help describe the function, architecture, process of development and/or design of the software. A software observation may include software malfunctions that occur during the SDLC. An analytic block may be a dedicated memory block for analyzing and tracking progress of the software.

At step 204, the recorded events occurring during the SDLC may be kept up-to-date to conform to changes that are introduced into the environment. At 208, an elastic monitoring model may determine the monitoring method based on the environment requirements.

At step 206, the engine may be able to define the: monitoring model, toolsets, alerting mechanisms, triggering mechanisms, and self-restoring options for monitoring the application, detecting application failures and remediating the detected failures. The engine may do so by examining the environment workload and dynamically determining the monitoring configurations. Based on the monitored instance and/or workload, monitoring parameters and a monitoring source may be defined. The required data correlation ability of the engine to retrieve sufficient inputs in order to determine where monitoring workloads should be placed may be defined.

At step 210, the live environment setup and/or physical setup of the environment may be executed. Live environment setup and/or physical setup of the environment 210 may be setup using infrastructure platform architecture 212 and application and software architecture 214. Infrastructure platform architecture 212 and application and software architecture 214 may include: environment profiling and security profiling, user profiling, client components and a dispatcher module, as shown at 216.

At step 218, the engine's graphical model generator may perform meta representation mapping (shown at 220) based on real-time platform and software behavior. The model generator may also compute the right stack and/or environment or configurations. The model generator may also compute the elastic monitoring definitions. The model generator may instantiate the simulation environment in order to simulate the effectiveness of a determined failure-remediation.

The engine's functions and/or domain emulator and prototype simulators may build the standard operating procedure ("SOP") sequence and scripting steps using pattern models, as shown at 220 and 226. Testing blocks and destination mappers may map the real-time failures and determined remediation steps to events that included at step 202. The communication between steps 222 and 202 may store the current failure and remediation thereof. This communication may enhance the SDLC to improve the application for further failure remediation.

Steps 230-238 may include creating and executing a script for remediation of the failure based on the simulation. Steps 230 shows transforming the configuration libraries to simulators into one or more executables. The executables may include elastic—i.e., adaptable—monitoring and troubleshooting codes, as shown at 232. The executables may include execution sequence and simulated SOPs, as shown at 234. The executables may also include automation scripting steps, as shown at 236. The executables may also include issue mapping and data analytic feed, as shown at 238.

Figure 3:
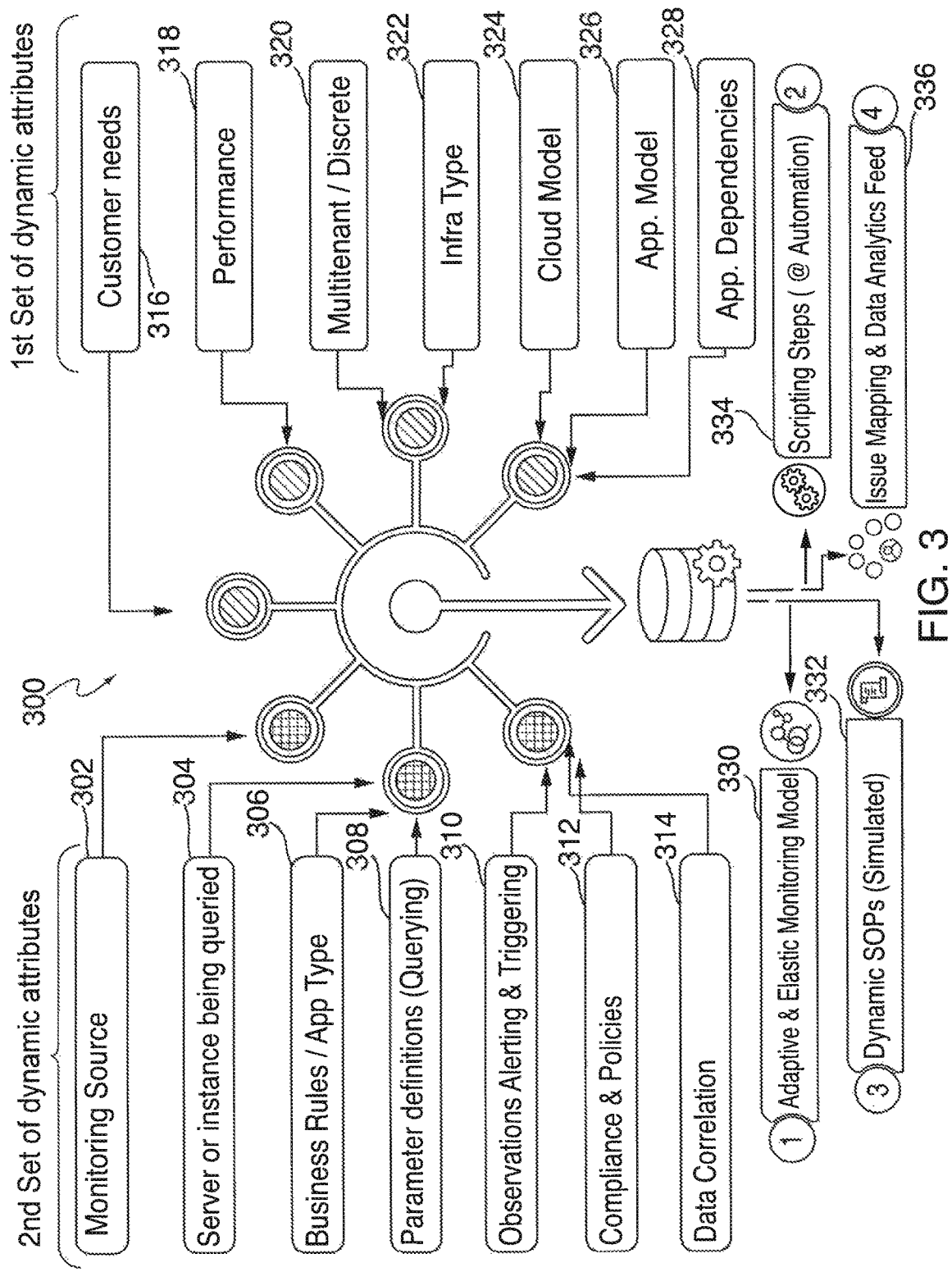
FIG. 3 shows yet another illustrative hybrid diagram/flow chart in accordance with principles of the invention.

FIG. 3 shows illustrative hybrid diagram/flow chart 300. Diagram 300 includes a first set of dynamic attributes (316-328) and a second set of dynamic attributes (302-304). The first set of dynamic attributes and the second set of dynamic attributes may be specific to an application. The first set of dynamic attributes may include customer needs 316, performance 318, multitenant/discrete 320, infra type 322, cloud model 324, app model 326, app. dependencies 328 and any other suitable dynamic attribute. Each dynamic attribute included in the first set of dynamic attributes may be a variable attribute. For example, customer needs 316 may change at a point in time.

The second set of dynamic attributes may include monitoring source 302, server or instance being queried 304, business rules/application type 306, parameter definitions (querying) 308, observations alerting and triggering 310, compliance and policies 312 and data correlations 314. Each dynamic attribute included in the second set of dynamic attributes may be dependent on at least one dynamic attribute included in the first set of dynamic attributes. For example, monitoring source 302 may be dependent on application model 326. When the application model 326 changes, monitoring source 302 may be required to change as well.

Because the second set of dynamic attributes are dependent on the first set of dynamic attributes, it may be important that the second set of dynamic attributes are updated to conform to the first set of dynamic attributes. The updating may be performed at least once during a monitoring cycle.

As shown at 330, the first set of dynamic attributes and the second set of dynamic attributes may enable an adaptive and elastic monitoring model. The dynamic SOPs may be created in a simulation environment, as shown at 332.

Based on the results of the simulation environment, scripts may be generated automatically, as shown at 334. The scripts may be executed within a live environment, as shown at 336. Information relating to the issue and data analytics information may be stored for future reference, also shown at 336.

Figure 4:
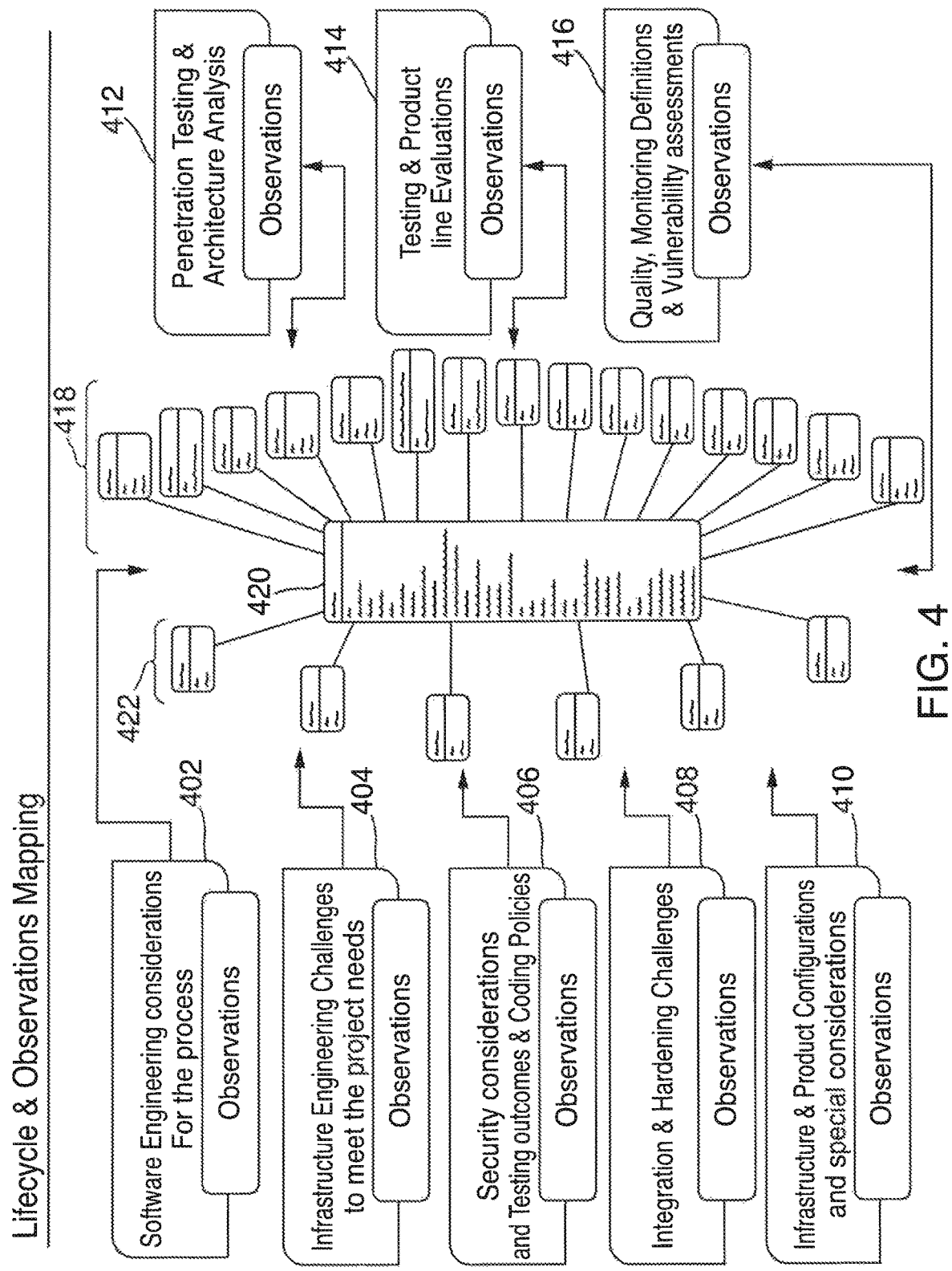
FIG. 4 shows still another illustrative hybrid diagram/flow chart in accordance with principles of the invention.

FIG. 4 shows an illustrative lifecycle and observations mapping hybrid diagram/flow chart. Various application observations may be documented. Each observation may be mapped.

The observations may include software engineering considerations for the process, as shown at 402. The observations may also include infrastructure and engineering challenges used to meet the project needs, as shown at 404. The observations may also include security considerations and testing outcomes and coding policies, as shown at 406. The observations may also include integrations and hardening challenges, as shown at 408. The observations may also include infrastructure and product configurations and special considerations, as shown at 410. The observations may include penetration testing and architecture analysis, as shown at 412. The observations may include testing and product line evaluations, as shown at 414. The observations may include quality, monitoring definitions and vulnerability assessment, as shown at 416. Mapping functions 418, 420 and 422 may enable mapping of the observations.

Thus, methods and apparatus for a dynamic failure-resolution computing engine are provided. Persons skilled in the art will appreciate that the present invention can be practiced by other than the described embodiments, which are presented for purposes of illustration rather than of limitation, and that the present invention is limited only by the claims that follow.

What is claimed is:

1. A dynamic failure-resolution computing engine comprising:
   a receiver configured to receive/retrieve historic observations from a plurality of sources associated with an application executing in an environment;
   a processor configured to:
   store the plurality of historic observations in a memory location associated with the application;
   monitor the application using an adaptive monitoring model, said adaptive monitoring model comprising a first set of dynamic attributes for the application and a second set of dynamic attributes for the application, wherein:
   the second set of dynamic attributes is dependent on the first set of dynamic attributes;
   the application is monitored at least once during each monitoring cycle; and
   at least once during each monitoring cycle, the second set of dynamic attributes are adjusted based on the current values of the first set of dynamic attributes;
   determine a failure occurring in the application based on the monitoring;
   determine an executable for failure remediation based on the determined failure, the monitoring and the historic observations as received at the receiver;
   simulate the executable remediating the application failure in a simulation environment, said simulation environment comprising graphic models, meta representations, functional simulators and pattern models;
   generate a script for remediating the application failure in the environment upon determination that the executable successfully remediates the application failure in the simulation environment;
   execute the script on the application in the environment; and
   delete the script from the environment;
   wherein the first set of dynamic attributes comprises performance of the application and/or the environment, multitenant or discrete environment data, infra type of the application, cloud model of the application, application model and application dependencies; and
   wherein the second set of dynamic attributes comprises a monitoring source for the adaptive monitoring model, a server or instance being queried by the application, business rules associated with the application, application type, parameter definitions for querying, observation alerting and triggering data, compliance data, policy data and data correlation.

2. The engine of claim 1, wherein the processor is further configured to delete the script from the point of script generation.

3. The engine of claim 1, wherein the processor is configured to store the executable as a historic observation.

4. The engine of claim 1, wherein the plurality of sources includes a database that stores historic software engineering considerations.

5. The engine of claim 1, wherein the plurality of sources includes a database that stores infrastructure engineering processes used to meet historic project requirements.

6. The engine of claim 1, wherein the plurality of sources includes a database that stores security considerations, testing outcomes and coding policies associated with a historic software development lifecycle of the application.

7. The engine of claim 1, wherein the plurality of sources includes a database that stores integration and hardening challenges associated with a historic software development lifecycle of the application.

8. The engine of claim 1, wherein the plurality of sources includes a database that stores infrastructure and product configurations and special considerations associated with a historic software development lifecycle of the application.

9. The engine of claim 1, wherein the plurality of sources includes a database that stores penetration testing and architecture analysis of a historic software development lifecycle of the application.

10. A method for dynamically resolving a failure occurring to an application in an environment, the method comprising:
receiving historic observations from a plurality of sources associated with an application executing in the environment;
storing the plurality of historic observations in a memory location associated with the application;
monitoring the application using an adaptive monitoring model, the adaptive monitoring model comprising a first set of dynamic attributes for the application and a second set of dynamic attributes for the application, wherein:
the second set of dynamic attributes is dependent on a current set of values assigned to the first set of dynamic attributes;
the application is monitored once during each monitoring cycle; and
at least once during each monitoring cycle, the second set of dynamic attributes are adjusted based on the current set of values of the first set of dynamic attributes;
determining, based on the monitoring, a failure occurring in the application;
determining, based on the determined failure, the monitoring and the received historic observations, an executable for failure remediation;
simulating the executable remediating the application failure in a simulation environment, said simulation environment comprising graphic models, meta representations, functional simulators and pattern models;
generating a script for remediating the application failure in the environment upon the determination that the executable remediates the application failure in the simulation environment;
executing the script on the application in the environment; and
deleting the script form the environment;
wherein the first set of dynamic attributes comprises performance of the application and/or the environment, multitenant or discrete environment data, infra type of the application, cloud model of the application, application model and application dependencies; and
wherein the second set of dynamic attributes comprises a monitoring source for the adaptive monitoring model, a server or instance being queried by the application, business rules associated with the application type, parameter definitions for querying, observation alerting and triggering data, compliance data, policy data and data correlation.

11. The method of claim 10, wherein the method further comprises deleting the script from the point of script generation.

12. The method of claim 10, wherein the method further comprises storing the executable as a historic observation.

13. The method of claim 10, wherein the plurality of sources includes a database which stores historic software engineering considerations.

14. The method of claim 10, wherein the plurality of sources includes a database which stores infrastructure engineering processes used to meet historic project requirements.

15. The method of claim 10, wherein the plurality of sources includes a database which stores security considerations, testing outcomes and coding policies associated with a historic software development lifecycle of the application.

16. The method of claim 10, wherein the plurality of sources includes a database which stores integration and hardening challenges associated with a historic software development lifecycle of the application.

17. The method of claim 10, wherein the plurality of sources includes a database which stores infrastructure and product configurations and special considerations associated with a historic software development lifecycle of the application.

18. The method of claim 10, wherein the plurality of source includes a database which stores penetration testing and architecture analysis of a historic software development lifecycle of the application.

* * * * *